United States Patent [19]

Rütt

[11] Patent Number: 4,930,059
[45] Date of Patent: May 29, 1990

[54] SWITCHED-MODE DC-TO-DC POWER CONVERTER

[76] Inventor: Winfried P. Rütt, Hauptstrasse 67, D-6087 Büttelborn 2, Fed. Rep. of Germany

[21] Appl. No.: 113,004

[22] Filed: Oct. 26, 1987

[30] Foreign Application Priority Data

Oct. 31, 1986 [DE] Fed. Rep. of Germany ....... 3637079

[51] Int. Cl.⁵ .......................................... H02M 3/335
[52] U.S. Cl. .......................................... 363/20; 363/71
[58] Field of Search ....................... 363/20, 21, 24, 25, 363/71

[56] References Cited

U.S. PATENT DOCUMENTS

| | | | |
|---|---|---|---|
| 4,253,137 | 2/1981 | Rao | 363/21 |
| 4,374,355 | 2/1983 | Steigerwald et al. | 363/21 |
| 4,455,596 | 6/1984 | Baker | 363/21 |
| 4,618,919 | 10/1986 | Martin | 363/21 |
| 4,641,229 | 2/1987 | Easter | 363/21 |
| 4,665,473 | 5/1987 | Onda et al. | 363/21 |
| 4,675,796 | 6/1987 | Gautherin et al. | 363/20 |

FOREIGN PATENT DOCUMENTS 170461 9/1985 Japan .

OTHER PUBLICATIONS

Taylor; "Einfach Taktvoll"; Oct. 1986 Elektronikpraxis, pp. 52–54.

Primary Examiner—Patrick R. Salce
Assistant Examiner—Jeffrey Sterrett

[57] ABSTRACT

A switched mode DC/DC power converter for high outputs includes two parallel channels. Each channel consists of a flyback transformer (Fb-Tr1, Fb-Tr2) with a timed primary switch (S1, S2) on the primary side and a secondary switch (S3, S4) on the secondary side. The output flow within one channel from the primary supply voltage Ub through the primary power switch (S1; S2), the flyback transformer (Fb-Tr1, Fb-Tr2), and the secondary power switch (S3; S4) to the secondary output voltage (Ua1, Ua2) occurs, respectively, during the blockage phase. The two flyback transformers (Fb-Tr1, Fb-Tr2) are loosely linked with each through a link circuit (L.C.). The link circuit (L.C.) transmits energy from the transformer which is, respectively, in the forward phase to the other transformer. The power switches (S1, S3; S2, S4) are actuated by a control unit (C.U.) so as to be of correct frequency and phase.

16 Claims, 3 Drawing Sheets

SWITCHED-MODE DC-TO-DC POWER CONVERTER

BACKGROUND OF THE INVENTION:

1. FIELD OF THE INVENTION:

The invention is directed to a switched-mode DC- to -DC which combines a flyback-type converter with a flux-type converter, containing at least a first and a second flyback transformer each with at least one primary winding and one secondary winding, wherein a timed primary switch is wired in series with the primary winding and one secondary switch is wired in series with each secondary winding.

2. DESCRIPTION OF THE RELATED ART

DC/DC power converters for converting a primary DC voltage into a secondary DC voltage are extensively known and in general use. Basically, one distinguishes between two types, the forward-type converter and the flyback-type converter. Flyback-type converters are only known as single phase circuits. Forward-type converters are built as single phase circuits and a push-pull type circuits.

The known flyback-type converters have a series of disadvantages. The calculation of the transformer requires lengthy repetitive processes, protective measures against transformer saturation, the effects of leakage inductance and exceeding of the breakdown voltage of the power switch must be taken, which greatly increases the quantity of the required components. The transformer transmits the energy only during half of each period, which tends to lower the overall efficiency of the circuit.

An increased energy flow and thus an improved efficiency result if push-pull circuits are used. Push-pull circuits are only known forward-type converters. Here, two power switches operate in push-pull action by means of two primary windings upon one transformer. Push-pull circuits require, however, very good balancing in the primary circuit, so that no DC current magnetic biasing arises in the transformer. In addition, specific protective measures must be taken in order to prevent the power switches from being simultaneously on line which would result in a short circuit.

A single-phase converter is known from the DE- pbulication "Elektronikpraxis", Oct. 1986, page 52 and following, which operates with two transformers, whose primary windings are wired in series and whose secondary windings are wired in parallel through each one rectifier. Through an appropriate polarity of the primary and secondary windings and the rectifiers, the one transformer works as forward-type while, the other transformer works as a flyback-type converter. This type of circuit has certain advantages compared to the basic circuits, for instance, no protective measures are required against exceeding the breakdown voltage of the power switch. In spite of that the quantity of components is still high because two transformers have to be used. Also, this circuit can only be operated as a single-phase converter. This means that each transformer transmits power only during one-half of each period.

A refinement of this circuit is known from the Japanese patent application No. 60-170461(A). Two transistors actuated in push-pull action work upon four transformers, of which, respectively, two operate as single phase flyback-type converters and the other two as single-phase forward-type converters with the help of rectifier diodes switched at the secondary windings for generation of secondary voltage. Here, also, each transformer transmits power only during half of each period.

A single-phase DC/DC power converter with a transformer and one primary winding is known from the U.S. Pat. No. 4,455,596. The transformer has two secondary windings, one of which acts as a flyback-type converter with the help of a rectifier diode of suitable polarity, and the other acts as a forward-type converter with the help of a rectifier diode of suitable polarity. The transformer transmits energy during both halves of each period. Of course, the energy transmitted during the flux phase must be temporarily stored in a memory choke and can only be released to a secondary circuit during the subsequent blocking phase. The necessity to utilize a memory choke and a second rectifier diode cancels the saving involved in utilizing a single transformer. Apart from that, both secondary voltages fluctuate greatly as a function of the respective load resistance, as this is known in flyback-type converters.

SUMMARY OF THE INVENTION

The present invention is based upon the task to provide a circuit arrangement for a DC/DC power converter, which transmits electrical power during the forward phase as well as during the blocking phase and operates with a minimum of components.

This task is solved by loosely linking the transformers with each other with the help of a link circuit which transmits energy from the transformer which is just in the forward phase to the other transformer.

This involves advantages in that the quantity of the components, particularly of the extensive and voluminous transformer components, is reduced to the absolute minimum and that the transformer are operated in an optimum fashion, since they transmit power during the flux phase as well as during the blocking phase. Flyback-type converters and forward-type converters can be switched to a secondary circuit, since they yield energy during differing periods. Also the voltage and current loads of the primary load switch are considerably reduced when compared with the conventional flyback converter.

The circuit arrangement in the subject invention represents the combination of a push-pull forward-type converter with a push-pull flyback-type converter, in spite of the fact that according to the prevailing opinion, push-pull flyback-type converters cannot exist. In this circuit arrangement, the demagnetizing of the transformer cores is actively assisted by the magnetic field of the respective other primary coil. For this reason, an air gap, such as in a conventional push-pull forward-type converter, would not be required in the transformer cores. The transformers can be dimensioned exclusively for the conducting state operation, which considerably simplifies the calculation.

Additionally, it is possible in this type of circuit to increase the demagnetizing of the transformer cores by the magnetic field respectively generated by the other primary winding up to an opposite magnetizing, so that the modulation of the iron core can be considerably increased compared to a conventional flyback-type converter, with the consequence of an improved power flow and efficiency.

A final advantage of this circuit consists in the possibility to tap two output voltages which can be regulated independently of each other. The regulating range of the two output voltages essentially depends in what ratio the flux converter portion of the circuit contributes to the generation of the individual secondary voltages.

The link circuit which connects the two flyback transformers with each other and which transmits energy from the tranformer which is forward in the flux phase to the other transformer, can be realized very easily in actual practice, and indeed either as an air gap between the two transformer cores, through which the magnetic lines of force can transit from one core to the other, or through a closed wire loop, which is wound over both transformers.

In order to be able to transmit particularly high powers, several transformer cores are put together in such a way, that they constitute the edges of a parallelepiped, particularly of a cube. Herein, a primary winding and a secondary winding is wound around each pair of magnetic cores.

The four primary windings can be supplied with current through four primary switches. In accordance with a refinement of the invention, two primary windings wound respectively upon two magnetic cores lying diagonally opposite each other can, however, be respectively wired in parallel, so that only two primary switches are required.

This embodiment with the magnetic cores arranged in a three-dimensional fashion has the advantage, that only relatively small core sizes are required, and that the number of windings of the primary and secondary coils are twice as great as is the case in conventional transformer circuits. This facilitates the accurate observance of the computed values in fabrication, especially with high outputs.

Because of the high timing frequency achievable with the circuit arrangement in the invention, it is advisable to design the power switches as semiconductor components. The primary switches are transistors; the secondary switches can, as required, be designed as transistors, thyristors or diodes.

It was shown in a surprising manner that the circuit operates perfectly also in case of only one primary switch being operative.

BRIEF DESCRIPTION OF THE DRAWINGS

The invention is to be explained with particularity with the help of the drawings in the form of embodiment examples, In which.

DESCRIPTION OF THE PREFERRED EMOBIDMENTS

Figure 1:
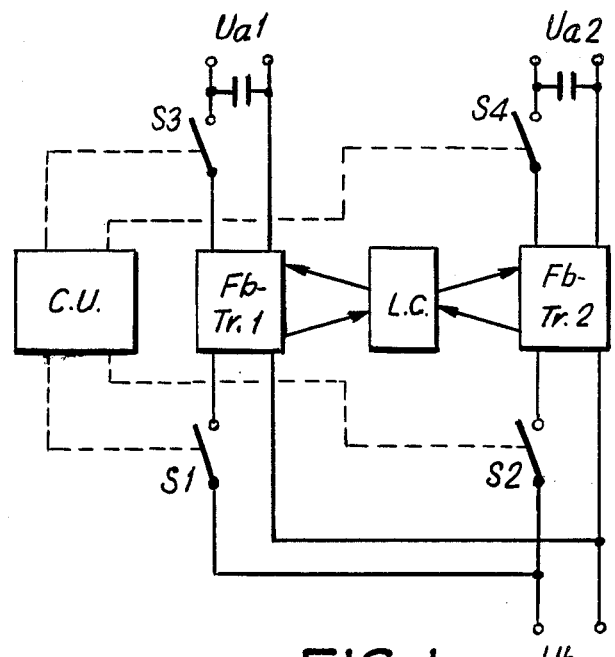
FIG. 1 is a block diagram of a DC/DC power converter.

FIG. 1 shows a push-pull DC/DC voltage converter as a block diagram in schematic illustration. Two flyback transformers Fb-Tr1, Fb-Tr2 are provided, whose primaries are each connected through one timed primary power switch S1, S2 alternately with the primary DC voltage Ub. The secondaries of the flyback transformers Fb-Tr1, Fb-Tr2 are applied to secondary DC voltage circuits through secondary power switches S3, S4, at which the secondary voltages Ua1, Ua2 can be tapped. The primary switches S1...S4 are switched on and off by a control unit C.U.

Both flyback tranformers Fb-Tr1, Fb-Tr2 are additionally loosely linked with each other by a link circuit L.C. This linkage is so that energy can be transmitted, respectively, from the transformer which is just in the forward phase to the other transformer. Both transformers transmit power during both halves of each period. They are being optimally utilized. The peak loads of the primary switches S1, S2 and lower, as far as the voltage and also the current is concerned, than is the case with conventional DC/DC voltage converters.

Figure 2:
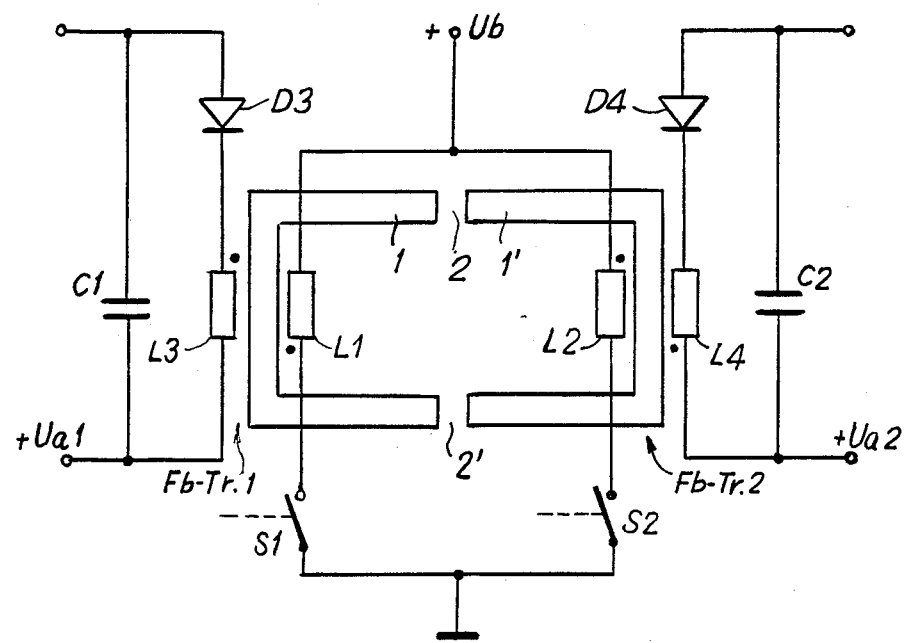
FIG. 2 shows a first DC/DC power converters in push-pull circuit with two output voltages;, FIG. 3 a DC/DC voltage converter circuit with one output voltage.

FIG. 2 shows a first realization of the circuit block diagram illustrated in FIG. 1. The first flyback transformer Fb-Tr1 is constituted by a U-core 1, which is wound with a primary winding L1 and a secondary winding L3. Both windings L1, L3 are closely linked as is known in flyback converters. The second flyback transformer Fb-Tr2 also consists of a U-core 1' which is wound with a primary winding L2 and a secondary winding L4. Both windings L2, L4 are closely linked.

Both primary windings L1, L2 are alternately switched to the primary DC voltage Ub through timed primary power switches S1, S2.

The secondary power switches are, in this case, designed as rectifier diodes D3, D4. The secondary DC voltages Ua1, Ua2 can be tapped at the condensers C1, C2. The level of the secondary output voltage Ua1, Ua2 can be controlled by the in-out ratio of the primary power switches S1, S2.

The linkage circuit L.C. is constituted by the air gaps 2, 2' in the embodiment example in FIG. 2. The magnetic lines of force transit from one transformer to the other through these air gaps 2, 2' and indeed, respectively, during its forward phase, which is caused by the polarity of the primary windings L1, L2, the secondary windings L3,L4 and the diodes D3,D4. The linkage between the two transformers Fb-Tr1, Fb-Tr2 can be influenced by the magnitude of the air gaps 2, 2'.

If, for instance, the primary power switch S1 is closed, then the transformer Fb-Tr1 is in the forward phase. The magnetic lines of force generated by the primary winding L1 in the transformer core 1 flows through the air gaps 2, 2' into the other transformer core 1' and generate a voltage in its secondary winding L4, which voltage is rectified by the diode D4 and supplied to the condenser C2, where it assists in the formation of the secondary voltage Ua2.

During the consecutive blocking phase of the transformer Fb-Tr1, the primary power switch S1 is open. The magnetic lines of force in the transformer core 1 generate now an output voltage in the secondary winding L3, which is rectified by the diode D3, transmitted to the condenser C1, where it assists in the generation of the secondary output voltage Ua1.

Analogous considerations can be made also for the transformer Fb-Tr2. Both flyback transformers Fb-Tr1, Fb-Tr2 thus alternately assist towards the generation of both output voltages Ua1, Ua2. The regulation range of the two output voltages Ua1, Ua2 essentially depends on the share with which the respective forward-type converter assists in the generation of the output voltages Ua1 or Ua2.

Figure 3:
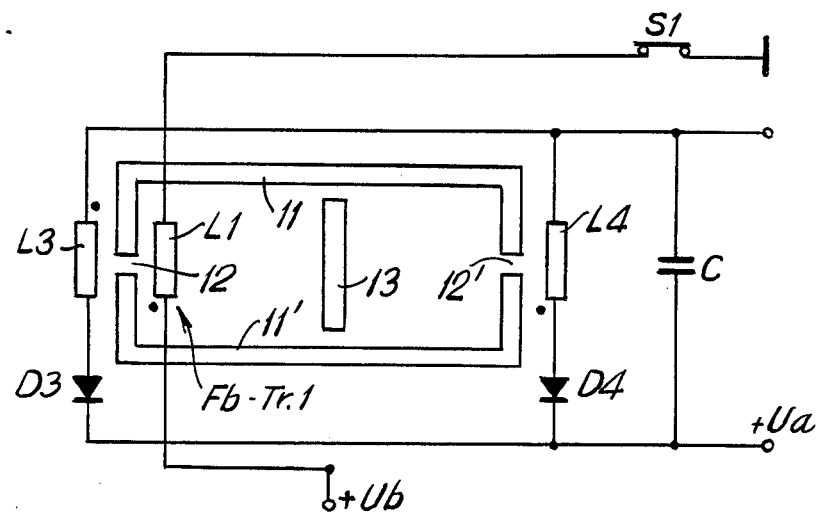

FIG. 3 shows a circuit arrangement in which two secondary windings L3, L4 operate through their associated rectifier diodes D3, D4 upon the same secondary circuit for generation of one single output voltage + Ua.

In this embodiment example, also the transformer core consists of two U-cores 11, 11', however with short legs and a long base. The winding pairs L1, L3 or L2, L4 are arranged in the region of the air gaps 12, 12'. The desired loose linkage is achieved by the length of the non-wound portion of the transformer cores 11, 11'. Fine adjustment of the magnetic linkage is additionally possible by a magnetic shunt 13.

In a circuit according to FIG. 3, with an output of approximately 1.5 kilowatts, it was possible to measure an efficiency of 96–98%.

In the circuits in FIGS. 2 and 3, the magnetic field built up by one primary coil in a transformer core is demagnetized by the magnetic field generated by the other primary coil L2 or L1. This demagnetizing by the other primary coil can be increased up to a magnetization of opposite polarity. The magnetic conditions in the transformer cores correspond then to those of a push-pull flux converter. For this reason, air gaps are unnecessary in the circuits in FIGS. 2 and 3. The flyback transformers can be dimensioned in accordance with the rules applicable for the push-pull forward-type converters-transformers. This applies aslso for the power switches.

Figure 4:
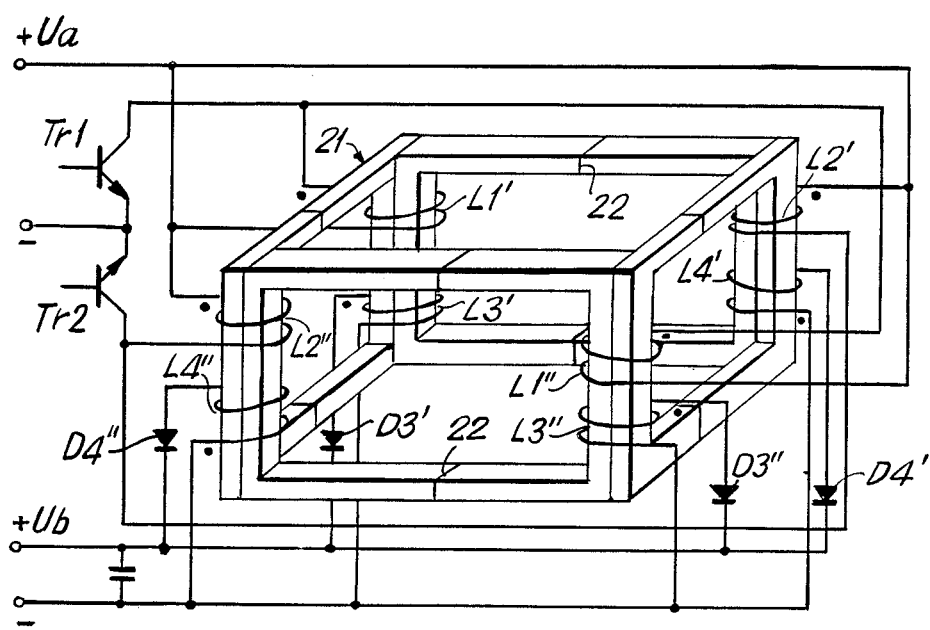
FIG. 4 shows a three-dimensional coil-transformer core arrangement for a DC/DC power converter in push-pull circuit for high powers.

FIG. 4 shows an arrangement of transformer cores, which is suited for particularly high outputs. The transformer core 21 consists of eight U-cores, which form the edges of a parallelepiped, especially that of a cube. The primary and secondary windings are divided into, respectively, two partial windings L1', L1''... L4', L4''. Partial windings with the same designation are located on legs of the transformer core 21 which are respectively diagonally opposite each other. The arrangement of the air gaps 22 occurs in the same way as was discribed in connection with FIGS. 2 or 3. Each partial winding has twice the number of individual windings. The partial windings carrying the same designations can be wired in parallel; it is however also possible to assign its own power switch to each partial winding.

Figure 5:
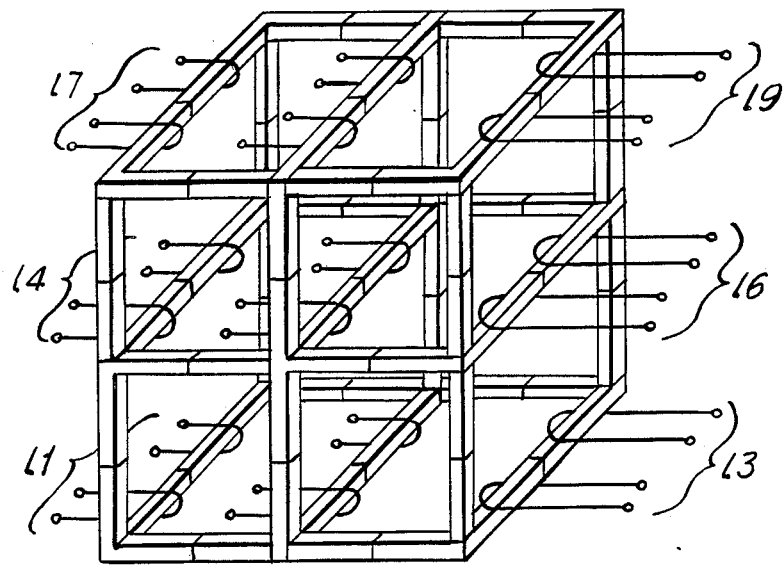
FIG. 5 shows an additional three-dimensional coil-transformer core arrangement, which yields four times the power of the arrangement in FIG. 4.

FIG. 5 shows a plan view of an arrangement of transformer cores and windings destined for even higher outputs. Here four arrangements corresponding to FIG. 4 are interlocked. Nine pairs of combined primary and secondary partial windings 11 ... 19 are attached, respectively, where the transformer cores touch. The combination of primary and secondary partial winding 11, 13, 15, 17, 19 are assigned to the flyback transformer the combination of primary and secondary partial windigns 12, 14, 16, 18 are assigned to the other flyback transformer, wherein, in this case also, the associated combination of primary and secondary partial windings are switched in series with a power switch either individually or in parallel.

Figure 6:
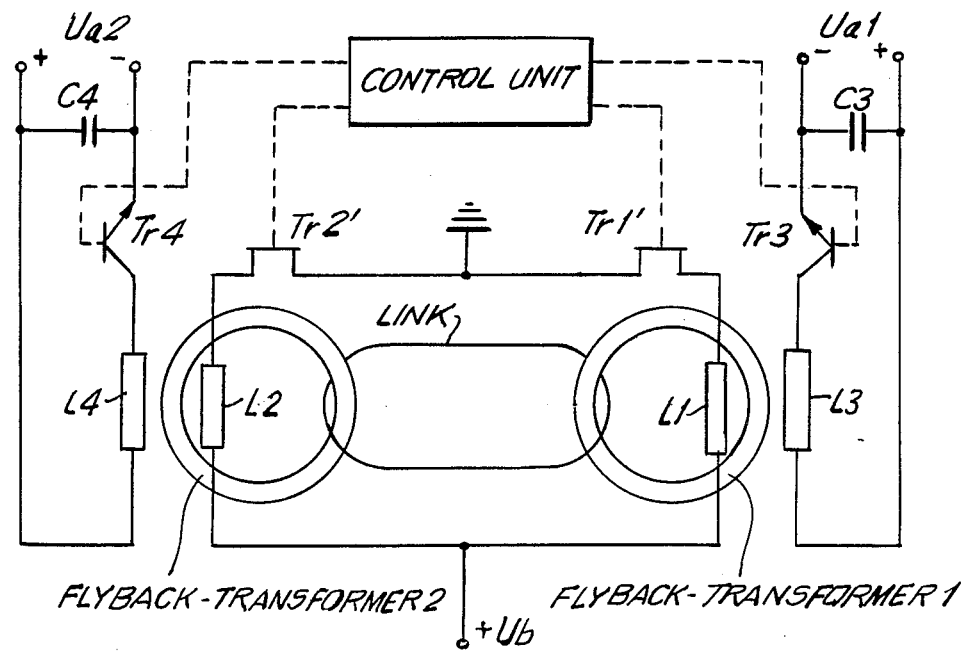
FIG. 6 shows a further DC/DC power converter having electronic switches and a control unit for controlling the switches.

FIG. 6 shows a modified circuit arrangement in which the linking circuit is a closed wire loop wound over both transfomer cores. The primary switches include thyristors Tr1' and Tr2', while the secondary switches include transistors Tr3 and Tr4. The primary switches Tr1', Tr2' and the secondary switches Tr3, Tr4, have their respective control inputs connected to respective outputs of a control unit which controls, in a timed relationship, the openings and closings of the respective pairs of switches.

I Claim:

1. A switched-mode DC-to-DC power converter, which combines a flyback-type converter with a forward-type converter, containing at least one first flyback transformer and one second flyback transformer, each of said transformers respectively including at least one primary winding and one secondary winding, wherein a timed primary switch is wired in series with each of the primary windings, respectively, and a secondary switch is wired in series with each of the secondary windings, respectively, characterized in that the transformers are loosely linked with each other by a link circuit, which transmits energy respectively from the transformer which is just in the forward phase to the other transformer.

2. A switched-mode DC-to-DC power converter according to claim 1, characterized in that the secondary switches are rectifier diodes.

3. A swithched-mode DC-to-DC power converter according to claim 1, characterized in that the secondary switches are thyristors.

4. A switched-mode DC-to-DC power converter according to claim 1, characterized in that the secondary switches are transistors.

5. A switched-more DC-to-DC power converter according to claim 1, characterized in that the link circuit is a closed wire loop which is wound over both transformers.

6. A switched-mode DC-to-DC power converter according to claim 1, characterized in that the link circuit is an air gap.

7. A swithched-mode DC-to-DC power converter according to claim 6, characterized in that the length of the air gap is adjustable.

8. A switched-mode DC-to-DC power converter according to claim 1, characterized in that the link circuit is a long leg of a transformer core which carriers no windings.

9. A switched-mode DC-to-DC power converter according to claim 1 or 8, characterized in that a magnetic shunt is arranged between legs of cores of the transformers.

10. A switched-mode DC-to-DC power converter according to claim 1, characterized in that cores of the transformers are U-cores, whose legs are opposite each other with, respectively, an gap between them.

11. A switched-mode DC-to-DC power converter according to claim 10, characterized in that the primary and secondary windings, forming each flyback transformers, on the magnet cores are arranged in the region of the air gaps.

12. A switched-mode DC-to-DC power converter according to claim 1, 10 or 11 characterized in that the transformers have cores forming edges of a parallelepiped, especially of a cube, and that one primary winding and one secondary winding is applied at the points where the cores touch.

13. A switched-mode DC-to-DC power converter according to claim 12, characterized in that respectively two primary windings and/or secondary windings being arranged diagonally opposite each other on the core legs are wired in parallel.

14. A swithced-mode DC-to-DC power converter according to claim 12, characterized in that a plurality of transformer cores are provided which form several interlocked parallelepipeds, especially cubes.

15. A swithched-mode DC-to-DC power converter according to claim 1, characterized in that the primary and secondary switches are controlled in push-pull operation with the same timing frequency, however with differing switched-on durations.

16. A switched-mode DC-to-DC power converter according to claim 1, characterized in that only one primary switch is provided.

* * * * *

UNITED STATES PATENT AND TRADEMARK OFFICE
CERTIFICATE OF CORRECTION

PATENT NO. : 4,930,059

DATED : May 29, 1990

INVENTOR(S) : Winfried Peter Rütt

It is certified that error appears in the above-identified patent and that said Letters Patent is hereby corrected as shown below:

Title page:

[73]   Assignee:   ELAN Elektronische Anlagen GmbH
D-6087 Büttelborn 2,
Federal Republic of Germany Signed and Sealed this Twenty-fifth Day of June, 1991

*Attest:*

HARRY F. MANBECK, JR.

*Attesting Officer*   *Commissioner of Patents and Trademarks*